Patented Sept. 7, 1948

2,448,831

UNITED STATES PATENT OFFICE 2,448,831

PRODUCTION OF ITACONIC ACID

Earl J. Roberts and Joseph A. Ambler, New Orleans, La., and Alfred Laurence Curl, Winter Haven, Fla., assignors to the United States of America as represented by the Secretary of Agriculture No Drawing. Application September 10, 1946, Serial No. 696,022

1 Claim. (Cl. 260—537)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of itaconic acid, being an improvement over the invention as disclosed and claimed in an application for patent, Serial No. 696,020 filed Sept. 10, 1946, by Joseph A. Ambler and Alfred Laurence Curl, entitled "Production of itaconic acid," and has among its objects a process of producing the acid in a simple and efficient manner in nearly quantitative yields and in a high state of purity.

Esters of the itaconic acid are valuable compounds useful in the formation of various types of plastics.

In general, according to the invention, aconitic acid in aqueous solution is decomposed to itaconic acid and carbon dioxide by heating in the presence of a small quantity of an inorganic salt of aconitic acid, the decomposition equation being represented as follows:

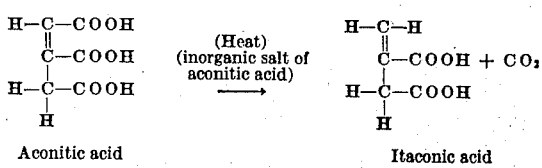

Aconitic acid          Itaconic acid

Aconitic acid may be decomposed to itaconic acid by heat alone. For example, evaporation on the steam bath or boiling at atmospheric pressure of an aqueous solution of aconitic acid results in a decrease in titratable acidity and in evolution of $CO_2$. The reaction when carried out at atmospheric pressure is much too slow, however, for practical production of the itaconic acid, and furthermore, the formed itaconic acid is in part either isomerized or polymerized, or both, due to the long heating period required for complete decomposition of the aconitic acid. The rate of decomposition may be increased by heating above the boiling point of the water present using pressure, but even with quite high temperatures, the time required is yet long.

It has been found, according to the present invention, that the rate of decomposition is accelerated by the presence of an inorganic salt of aconitic acid. The itaconic acid can be produced according to the present invention in nearly quantitative yields in a state of high purity at temperatures of about 140° C. in shorter periods of time than if the salt of the aconitic acid be not present, and can be produced without the formation of any of the isomer, citraconic acid. In some instances, however, small quantities of citraconic acid may be formed, but for some uses of the final product, the presence of this isomer, in small amounts at least, along with the itaconic acid is not detrimental and may be advantageous.

The addition of the inorganic salt of the aconitic acid is most conveniently accomplished by the addition of a small amount of a basic inorganic compound or neutralizing material to the aqueous solution of aconitic acid, thereby to neutralize a part of the aconitic acid, the basic inorganic compound ionizing in the aqueous solution to give cations in the solution thus forming soluble salts of the aconitic acid. This results in a decrease in acidity of the solution.

Many metallic cations, such as those of copper, zinc, mercury, potassium and barium, are effective for the purpose of the invention. However, magnesium excepted, cations of the alkali earth metals, in particular calcium, are preferred, in that the quantity required for maximum effectiveness is small, and with most of them, no isomerization of the itaconic acid to the citraconic acid takes place. Use of magnesium and the alkali metals results in accelerating isomerization of the itaconic acid as well as accelerating decomposition of the aconitic acid to the itaconic acid.

The quantity of cation added should be small in order to neutralize only a small part of the aconitic acid. The quantity can best be gaged by measurement of the pH of the resulting aqueous solution of the aconitic acid and formed salt. Generally speaking, the pH of the solution should be raised to not more than 4, a range of from 1 to 4 being permissible but about 2 being preferred.

Although the preferred temperature for effecting the decomposition is in the range 140° to 150° C., this range is not sharply critical, since the decomposition takes place at lower temperatures, although of course it is accelerated by raising the temperature.

The following table illustrates the invention under varying conditions as applied to substantially pure aconitic acid in aqueous solution, the decompositions being effected in an autoclave. All examples are based on 10 ml. portions of aqueous solution of the aconitic acid.

| Example | Concentration of aconitic acid, per cent | Basic inorganic compound added | Quantity of basic inorganic compound added | pH of resulting solution | Temperature, °C. | Conversion to itaconic acid, per cent | Conversion of itaconic acid to citraconic acid, mg. |
|---|---|---|---|---|---|---|---|
| | | | $Mg.$ | | | | |
| I | 10 | NaOH | 114.9 | 2.66 | 140 | 100 | 26. |
| II | 10 | MgO | 28.95 | 2.20 | 140 | 100 | 39. |
| III | 10 | $CaCO_3$ | 71.8 | 2.20 | 140 | 100 | Negligible. |
| IV | 15 | $NiCO_3$ | 12 | 1.40 | 140 | 97.5 | Do. |

The time for completion of the decomposition may be determined by noting the cessation of evolution of $CO_2$, and to obtain completion of the reaction, the time used should in any event extend until the evolution of $CO_2$ ceases.

The foregoing examples exhibit the invention as applied to substantially pure aconitic acid which is partially neutralized by the added basic inorganic compound. The decomposition process is not necessarily so limited, however, since it is possible to decompose certain inorganic salts of the aconitic acid to corresponding salts of itaconic acid and of citraconic acid. The salts of aconitic acid used should be mono or di salts, in which case, of course, the aconitic acid salt is yet dibasic or monobasic. Example V exhibits the invention as applied to such a salt.

Example V 1.126 grams of monosodium aconitate (equivalent to 1 gram of aconitic acid) dissolved in 10 ml. of water (pH 3.3) was autoclaved at 140° C. In 2 hours the aconitate was completely decomposed. From the resulting solution of monosodium dicarboxylates, 39 milligrams of citraconic acid formed by isomerization of the acid itaconate initially produced was obtained.

Example VI illustrates the invention in which aconitic acid is first converted to a mono or di salt and the salt then decomposed to the corresponding itaconates.

Example VI

To a solution of 1 gram of aconitic acid in 10 ml. of water was added one-half the amount of calcium carbonate necessary to neutralize the acid and the carbon dioxide generated was removed under vacuum. The solution had a pH of 3.55 and contained a mixture of monohydrogen and dihydrogen calcium aconitates. After autoclaving for 2 hours at 140° C., no aconitates remained, and the solution contained a mixture of neutral and acid calcium itaconates. No citraconate was found.

The foregoing examples deal with substantially pure aconitic acid and mono or di salts of such acid as the starting materials, and are included in the disclosure of the above-identified application. The invention has a greater practical utility, however, if certain alkali-earth aconitates as they are obtained from sorgo or sugarcane products, as described, for example, in Patent No. 2,280,085 and Patent No. 2,359,537, are used as the starting material. Example VII illustrates the invention in particular as applied to these aconitates.

Example VII 60 grams of commercial grade alkali-earth aconitate, containing 15.8% calcium, 3.1% magnesium, and 59% aconitic acid, was made into a slurry with 210 grams of water and 30 grams of concentrated sulfuric acid, producing a mixture having a pH of 2.0. This was heated in an autoclave at 140° C. for 2 hours, after which time evolution of carbon dioxide had stopped, and the mixture had a pH of 2.6. Five grams of concentrated sulfuric acid was added and the calcium sulfate precipitate was removed by filtration. From the filtrate 0.63 gram of citraconic acid (2.4% theoretical yield) and 23.5 grams of crude itaconic acid (88.3% theoretical yield), melting at 159° to 162° C. and having a neutralization equivalent of 64.75 was obtained. After one recrystallization the itaconic acid obtained melted at 160° to 161.5° C. and had a neutralization equivalent of 64.9 (theoretical is 65).

By following the procedure of Example VII, the necessity of intermediately converting the naturally occurring aconitates to aconitic acid is avoided, since the itaconic acid is obtained directly, thus making the process less costly. The chemical process is, of course, essentially the same as in the case of use of pure aconitic acid, since the sulfuric acid added to the alkali-earth aconitates (in an amount slightly less than chemically equivalent to the cations present in the aconitate solution) first reacts with a part of the aconitates to form free aconitic acid and certain insoluble sulfates (particularly calcium sulfate, since the naturally occurring aconitates are principally calcium aconitate), which precipitate. Remaining, however, is a certain small amount of unreacted alki-earth aconitates, particularly calcium aconitate, which has the same effect as if the starting material had been pure aconitic acid partially neutralized by formation of small amounts of calcium aconitate therein. In this case also, the amount of sulfuric acid added to the aconitate solution should be such as to produce a solution with a pH from 1 to 4. Example VII shows formation of some citraconic acid, due to the presence of magnesium aconitate along with the calcium aconitate in the alkali-earth aconitate used as the starting material.

Having thus described the invention, what is claimed is:

A process comprising treating an aqueous suspension of an alkali earth aconitate with sulfuric acid in an amount less than chemically equivalent to the actions present in the aconitate but sufficient to give a pH from 1 to 4, thereby to convert most of the aconitates to aconitic acid leaving present a small quantity of the aconitates, and heating to decompose the aconitic acid in the solution to itaconic acid and carbon dioxide in the presence of the aconitates.

EARL J. ROBERTS.
    JOSEPH A. AMBLER.
    ALFRED LAURENCE CURL.

REFERENCES CITED

The following references are of record in the file of this patent:

Baker, J. Chem. Soc., (London), 1935, pages 188–194.

Hawaiian Planters Record, vol. 47, 1943, pages 71–73.

Miolati et al., Chemical Abstracts, vol. 37, page 6247 (1943).

Umbdenstock et al., Ind. & Eng. Chem., pages 963–967 (1945).

Ventre et al., Ind. & Eng. Chem., pages 201–204 (1946).